US008305586B2

(12) United States Patent
Yasuda et al.

(10) Patent No.: US 8,305,586 B2
(45) Date of Patent: Nov. 6, 2012

(54) OPTICAL ENCODER, BENDING OPERATION SYSTEM, AND METHOD OF DETECTING DISPLACEMENT OF LINEAR POWER TRANSMISSION MEMBER

(75) Inventors: Mamoru Yasuda, Hino (JP); Takahiro Komuro, Hino (JP)

(73) Assignee: Olympus Corporation, Tokyo (JP)

( * ) Notice: Subject to any disclaimer, the term of this patent is extended or adjusted under 35 U.S.C. 154(b) by 366 days.

(21) Appl. No.: 12/728,369

(22) Filed: Mar. 22, 2010

(65) Prior Publication Data
US 2010/0245846 A1 Sep. 30, 2010

(30) Foreign Application Priority Data

Mar. 23, 2009 (JP) ................. 2009-070738
Mar. 23, 2009 (JP) ................. 2009-070739

(51) Int. Cl.
*G01B 11/14* (2006.01)
(52) U.S. Cl. .............. 356/614; 356/617; 356/622
(58) Field of Classification Search .... 356/237.1–241.6, 356/242.1–243.8, 426–431, 600–640
See application file for complete search history.

(56) References Cited

U.S. PATENT DOCUMENTS

| | | | | |
|---|---|---|---|---|
| 3,816,003 A * | 6/1974 | Litke | ............................ | 356/395 |
| 3,867,037 A * | 2/1975 | Litke | ............................ | 356/619 |
| 4,275,965 A * | 6/1981 | Snitzer et al. | ................. | 356/617 |
| 5,006,703 A * | 4/1991 | Shikunami et al. | ...... | 250/231.13 |
| 5,671,052 A * | 9/1997 | Kawakubo et al. | ........... | 356/616 |
| 7,329,858 B2 * | 2/2008 | Okada | ..................... | 250/231.13 |

FOREIGN PATENT DOCUMENTS

| | | |
|---|---|---|
| JP | 2-103211 A | 4/1990 |
| JP | 07-21891 A | 8/1995 |
| JP | 2000-18971 | 1/2000 |
| JP | 4005318 | 11/2007 |
| JP | 2008-215911 A | 9/2008 |

* cited by examiner

*Primary Examiner* — Gregory J Toatley
*Assistant Examiner* — Jarreas C Underwood
(74) *Attorney, Agent, or Firm* — Scully, Scott, Murphy & Presser, PC (57) ABSTRACT

An optical encoder includes a linear power transmission member which moves longitudinally, a reflector which is provided on an outer peripheral surface of the linear power transmission member and which is longitudinally movable integrally with the linear power transmission member, the reflector including two kinds of reflecting portions different in reflectance are longitudinally arranged, and a light source which radiates light. Further, the optical encoder includes a linear light transmitter which guides the light from the light source to the reflector and to which reflection light reflected from the reflector is guided, and a calculation mechanism configured to calculate a longitudinal displacement of the reflector on the basis of an intensity of the reflection light from the reflector which is guided via the linear light transmitter.

13 Claims, 8 Drawing Sheets

```
┌─────────────────────────────────────────────┐
│ Light enters slit portions 40A, 40B, 40Z    │─ S101
└─────────────────────────────────────────────┘
                      ↓
┌─────────────────────────────────────────────┐
│ Light receiving element receives light       │─ S102
│ reflected from slit portions 40A, 40B, 40Z  │
└─────────────────────────────────────────────┘
                      ↓
┌─────────────────────────────────────────────┐
│ Detect electric signal of waveform indicating│─ S103
│ displacement of encoder slit part 32 and     │
│ light amount                                 │
└─────────────────────────────────────────────┘
                      ↓
┌─────────────────────────────────────────────┐
│ Convert into pulse signal having threshold t1│─ S104
└─────────────────────────────────────────────┘
                      ↓
┌─────────────────────────────────────────────┐
│ Calculate displacement amount, movement      │─ S105
│ direction and amount of movement from        │
│ standard position of encoder slit part 32    │
│ from number of pulses of pulse signal        │
└─────────────────────────────────────────────┘
```

OPTICAL ENCODER, BENDING OPERATION SYSTEM, AND METHOD OF DETECTING DISPLACEMENT OF LINEAR POWER TRANSMISSION MEMBER

CROSS-REFERENCE TO RELATED APPLICATIONS

This application is based upon and claims the benefit of priority from prior Japanese Patent Applications No. 2009-070738, filed Mar. 23, 2009; and No. 2009-070739, filed Mar. 23, 2009, the entire contents of both of which are incorporated herein by reference.

BACKGROUND OF THE INVENTION

1. Field of the Invention

The present invention relates to an optical encoder and a bending operation system configured to detect a longitudinal displacement of a linear power transmission member such as a wire, and to a method of detecting a displacement of the linear power transmission member using the optical encoder.

2. Description of the Related Art

In general, operation systems, for example, a manipulator and an endoscope use a driving mechanism configured to bend a moving part by a linear power transmission member such as a wire. These operation systems need to be provided with a detecting mechanism configured to detect the bending angle of the moving part in order to accurately control the movement of the endoscope and manipulator.

An encoder that uses an optical fiber has been disclosed in Jpn. Pat. Appln. KOKAI Publication No. 2000-18971. In this encoder, light enters a target rotor from a light source via the optical fiber, and the amount of the light reflected to the optical fiber from the rotor is detected. Thereby, the rotation position and rotation direction of the rotor are detected.

Published Japanese Patent No. 4005318 discloses an optical fiber type detection sensor configured to detect the bending angle of an endoscope. In this detection sensor, a plurality of light absorbing parts are formed in the optical fiber, and the amount of light absorbed by the light absorbing parts is detected. The amount of light absorbed by the light absorbing parts changes depending on the bending angle of a moving part of the endoscope. Therefore the amount of light absorbed by the light absorbing parts is detected to detect the bending angle of the moving part of the endoscope.

BRIEF SUMMARY OF THE INVENTION

According to one aspect of the invention, there is provided an optical encoder comprising: a linear power transmission member which moves longitudinally; a reflector which is provided on an outer peripheral surface of the linear power transmission member and which is longitudinally movable integrally with the linear power transmission member, the reflector including two kinds of reflecting portions different in reflectance are longitudinally arranged; a light source which radiates light; a linear light transmitter which guides the light from the light source to the reflector and to which reflection light reflected from the reflector is guided; and a calculation mechanism configured to calculate a longitudinal displacement of the reflector on the basis of an intensity of the reflection light from the reflector which is guided via the linear light transmitter.

According to one other aspect of the invention, there is provided an optical encoder comprising: a linear power transmission member which moves longitudinally; a reflector which is fixed onto an outer peripheral surface of the linear power transmission member and which is longitudinally movable integrally with the linear power transmission member, the reflector including a slit portion in which two kinds of reflecting portions different in reflectance are longitudinally arranged with a predetermined pattern; a light source which radiates light; a linear light transmitter which guides the light from the light source to the slit portion and to which reflection light reflected from the slit portion is guided; and a holding member which longitudinally movably holds the linear power transmission member and the reflector and also holds the linear light transmitter at such a position that allows the light to enter the slit portion and allows the reflection light from the slit portion to be guided; a light receiving element which receives the reflection light in the slit portion guided from the linear light transmitter and which detects an electric signal indicating a displacement of the reflector and a light amount; a signal processing mechanism configured to convert the electric signal into a pulse signal having a predetermined threshold; and a calculation mechanism configured to calculate the longitudinal displacement of the reflector from a number of pulses of the pulse signal.

According to one other aspect of the invention, there is provided a bending operation system comprising: an elongated tubular part; a linear power transmission member disposed in the tubular part; a moving part to which a distal end of the linear power transmission member is connected and which is configured to perform a bending operation in accordance with a longitudinal movement of the linear power transmission member; a driving mechanism configured to drive the moving part; and an optical encoder including: a reflector which is provided on an outer peripheral surface of the linear power transmission member and which is longitudinally movable integrally with the linear power transmission member, the reflector including two kinds of reflecting portions different in reflectance are longitudinally arranged; a light source which radiates light; a linear light transmitter which guides the light from the light source to the reflector and to which reflection light reflected from the reflector is guided; and a calculation mechanism configured to calculate a longitudinal displacement of the reflector on the basis of an intensity of the reflection light from the reflector which is guided via the linear light transmitter.

According to one other aspect of the invention, there is provided a bending operation system comprising: an elongated tubular part; a linear power transmission member disposed in the tubular part; a moving part to which a distal end of the linear power transmission member is connected and which is configured to perform a bending operation in accordance with a longitudinal movement of the linear power transmission member; a driving mechanism configured to drive the moving part; and an optical encoder including: a reflector which is fixed onto the outer peripheral surface of the linear power transmission member and which is longitudinally movable integrally with the linear power transmission member, the reflector including a slit portion in which two kinds of reflecting portions different in reflectance are longitudinally arranged with a predetermined pattern; a light source which radiates light; a linear light transmitter which guides the light from the light source to the slit portion and to which reflection light reflected from the slit portion is guided; a holding member which longitudinally movably holds the linear power transmission member and the reflector and also holds the linear light transmitter at such a position that allows the light to enter the slit portion and allows the reflection light from the slit portion to be guided; a light receiving element which receives the reflection light in the slit portion guided from the linear light transmitter and which detects an electric signal indicating a displacement of the reflector and a light amount; a signal processing mechanism configured to convert the electric signal into a pulse signal having a predetermined threshold; and a calculation mechanism configured to calculate the longitudinal displacement of the reflector from a number of pulses of the pulse signal and also calculate a bending angle and a bending direction of the moving part from the longitudinal displacement of the reflector.

According to one other aspect of the invention, there is provided a method of detecting a displacement of a linear power transmission member, the method comprising: causing light to enter two kinds of reflecting parts from a light source via a linear light transmitter, the two kinds of reflecting parts being provided in a reflector which is longitudinally movable integrally with the linear power transmission member; receiving, via the linear light transmitter, reflection light reflected from the reflector; and detecting a longitudinal displacement of the reflector on the basis of an intensity of the received light.

According to one other aspect of the invention, there is provided a method of detecting a displacement of a linear power transmission member, the method comprising: causing light to enter a slit portion from a light source via a linear light transmitter, the slit portion being provided in a reflector which is longitudinally movable integrally with the linear power transmission member, the slit portion including two kinds of reflecting parts different in reflectance which are longitudinally arranged with a predetermined pattern; guiding reflection light reflected by the slit portion to the linear light transmitter and receiving the light by a light receiving element; detecting, by the light receiving element, an electric signal indicating a displacement of the reflector and a light amount; converting, by signal processing mechanism, the electric signal into a pulse signal having a predetermined threshold; and calculating, by calculation mechanism, the longitudinal displacement of the reflector from a number of pulses of the pulse signal.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
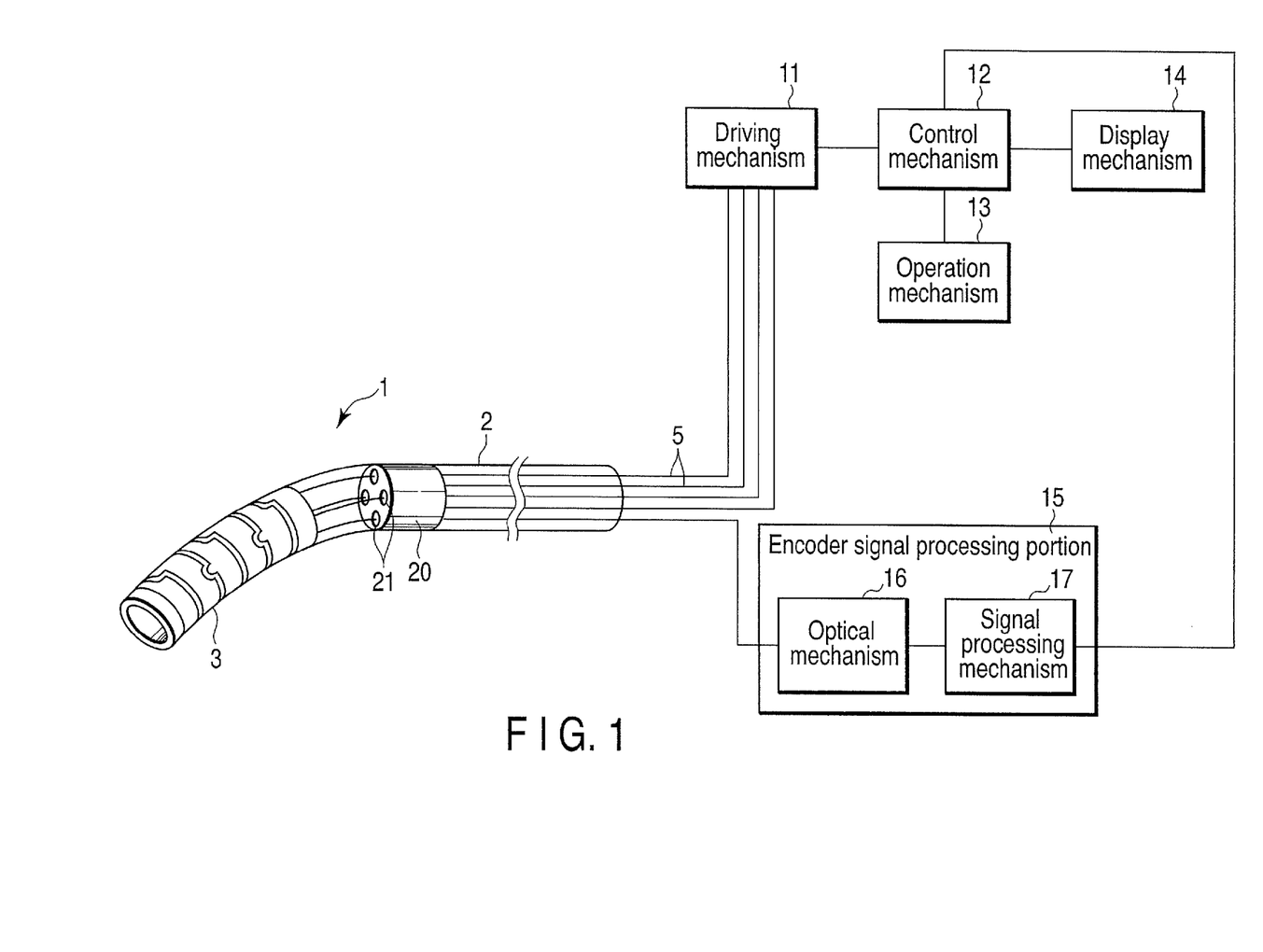
FIG. 1 is a schematic view showing a bending operation system of a manipulator comprising an optical encoder according to a first embodiment of the present invention.
Figure 2:
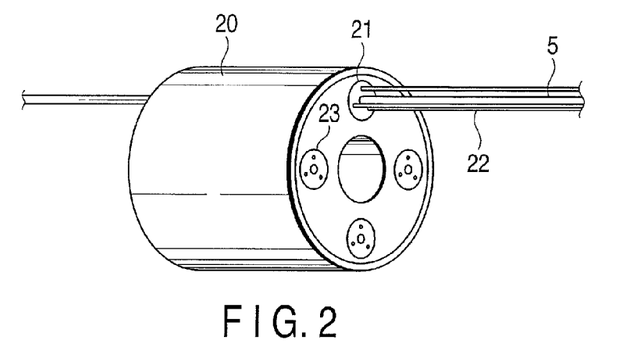
FIG. 2 is a perspective view showing the configuration of an encoder link part according to the first embodiment.

A first embodiment of the present invention will be described with reference to FIG. 1 to FIG. 12B. FIG. 1 is a view showing a bending operation system of a manipulator 1 comprising an optical encoder according to the present embodiment. As shown in FIG. 1, the manipulator 1 includes an elongate tubular part 2, and a moving part 3 provided to a distal end side of the tubular part 2. Four wires 5, which are linear power transmission members, are inserted through the tubular part 2 of the manipulator 1 and connected to the moving part 3. Two of the four wires 5 are connected to the upper portion and lower portion of the moving part 3, respectively. These two wires 5 are used for an upward/downward bending operation. The other two wires 5 are connected to the left portion and right portion of the moving part 3, respectively. These two wires 5 are used for a leftward/rightward bending operation. The proximal ends of the wires 5 are connected to driving mechanism 11 provided outside the manipulator 1. The driving mechanism 11 is, for example, a combination of a rotary motor and a pulley, or a linear motor. Each of the wires 5 is connected to each motor, or the integrated wires 5 for the upward/downward bending operation and the integrated wires 5 for the leftward/rightward bending operation are wound around the respective pulleys. The driving mechanism 11 is connected to control mechanism 12 such as a computer. The control mechanism 12 is connected to operation mechanism 13 such as a joystick or handle and to image display mechanism 14 such as a display. Images taken by, for example, a camera (not shown) provided at the distal end of the manipulator are displayed on the image display mechanism 14.

In order to bend the moving part 3, an operator operates the operation mechanism 13 in a direction to bend the moving part 3 while observing the images displayed on the image display mechanism 14. A signal input to the operation mechanism 13 is sent to the control mechanism 12. The control mechanism 12 performs a predetermined computation to correspond to the movement of the moving part 3, and calculates a displacement of the motor of the driving mechanism 11 that drives the moving part 3. The calculated displacement of the motor of the driving mechanism 11 is sent to the driving mechanism 11 as a signal. The driving mechanism 11 converts the signal from the control mechanism 12 into a current signal for driving the motor, so that the motor is driven. The motor of the driving mechanism 11 is driven, and the wires 5 connected to the moving part 3 are thereby pushed out toward the distal side or pulled toward the proximal side. For example, in order to upwardly bend the moving part 3 of the manipulator 1, the wire 5 connected to the upper portion of the moving part 3 is pulled toward the proximal side, and the wire 5 connected to the lower portion of the moving part 3 is pushed out toward the distal side. Thus, the bending angle of the moving part 3 of the manipulator 1 changes in the upward/downward and leftward/rightward directions.

As shown in FIG. 1, a columnar encoder link part 20 that configures the optical encoder is provided in the vicinity of the moving part 3 in the tubular part 2 of the manipulator 1. FIG. 2 is a view showing the configuration of the encoder link part 20. As shown in FIG. 2, the encoder link part 20 is provided with columnar slot portions 23 longitudinally penetrating the encoder link part 20, and the number of the slot portions 23 corresponds to the wires 5 (four in the present embodiment). The four slot portions 23 are substantially concentrically provided about 90° apart from one another in the circumferential direction of the encoder link part 20. An encoder head part 21 is fixedly held in each of the slot portions 23. The encoder head part 21 is used to detect the displacement amount of each wire 5, the movement direction of the displacement, and the amount of movement from a standard position.

Figure 3:
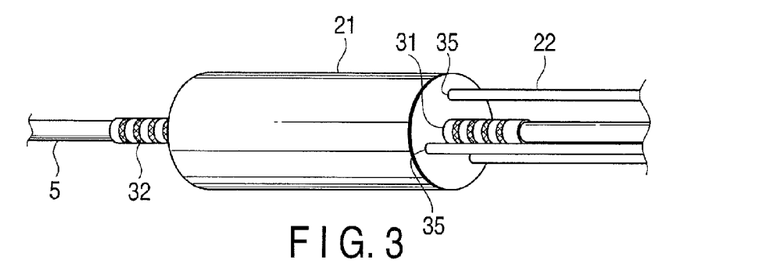
FIG. 3 is a perspective view showing the configuration of an encoder head part according to the first embodiment.
Figure 4:
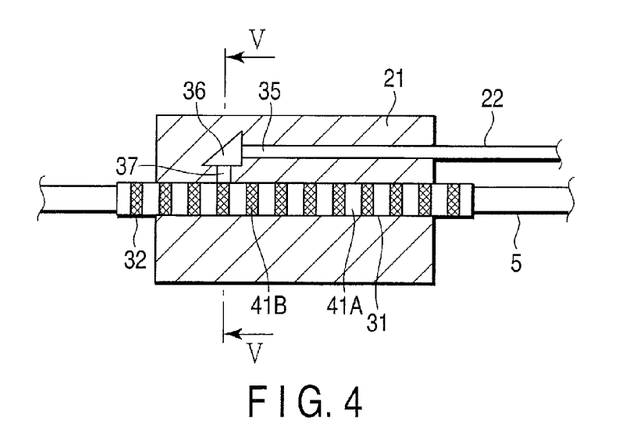
FIG. 4 is a longitudinal sectional view showing the configuration of the encoder head part according to the first embodiment.
Figure 5:
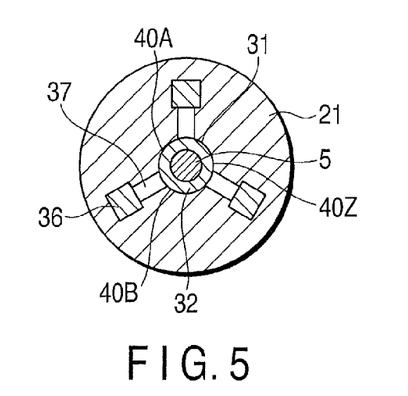
FIG. 5 is a sectional view taken along the line V-V of FIG. 4.
Figure 6:
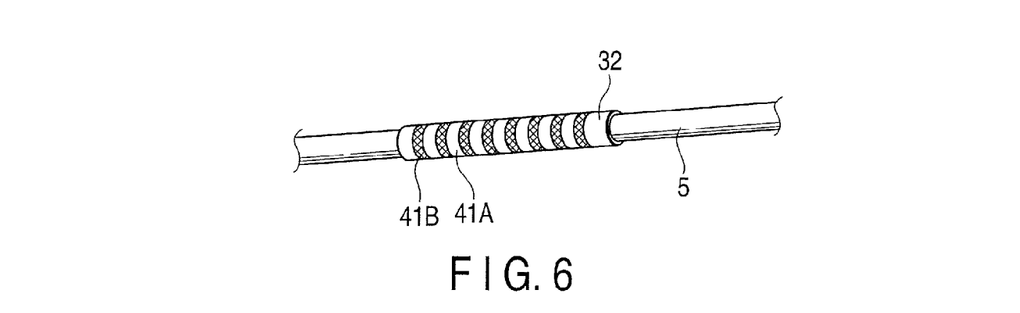
FIG. 6 is a perspective view showing the configuration of an encoder slit part according to the first embodiment.

FIG. 3 to FIG. 5 are views showing the configuration of one encoder head part 21. As shown in FIG. 3 to FIG. 5, a columnar central hole 31 longitudinally penetrating the encoder head part 21 is formed in the axial center of the encoder head part 21. A cylindrical encoder slit part 32, which is a reflector, having a given length longitudinally is fixed onto the outer peripheral surface of the wire 5. That is, the wire 5 is inserted through the encoder slit part 32 in such a way as to be fixed onto the inner peripheral surface of the encoder slit part 32. The wire 5 and the encoder slit part 32 are inserted through the central hole 31 being movable back and forth longitudinally. That is, in the central hole 31 of the encoder head part 21, the wire 5 and the encoder slit part 32 are integrally movable in the longitudinal direction with respect to the encoder head part 21. Such a configuration allows the wire 5 and the encoder slit part 32 to be held by the encoder head part 21, which is a holding member, being movable longitudinally.

Figure 7:
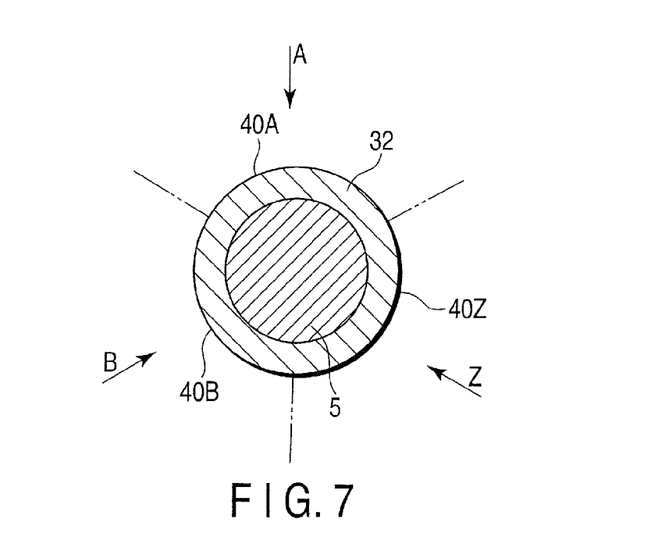
FIG. 7 is a cross-sectional view showing the configuration of the encoder slit part according to the first embodiment.

FIG. 6 to FIG. 8C are views showing the configuration of the encoder slit part 32. As indicated by two-dot chain lines in FIG. 7, the circumference of the encoder slit part 32 is divided into three reading regions by 120°. As shown in FIG. 5 and FIG. 7, a first slit portion 40A, a second slit portion 40B and a third slit portion 40Z are formed in the three divisional parts. That is, the slit portion 40A, 40B, 40Z is formed on the outer peripheral surface of the encoder slit part 32 to have a phase difference of 120° with respect to the adjacent slit portion 40A, 40B, 40Z in the periaxial direction.

Figure 8A:
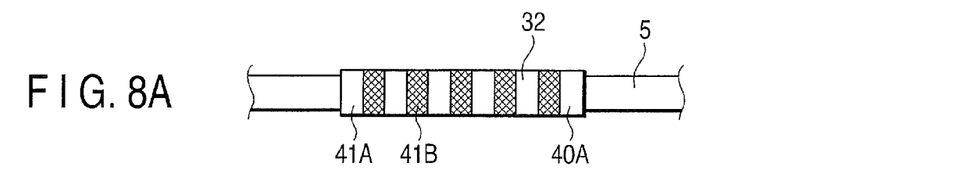
FIG. 8A is a view showing FIG. 7 from the direction of the arrow A.
Figure 8B:
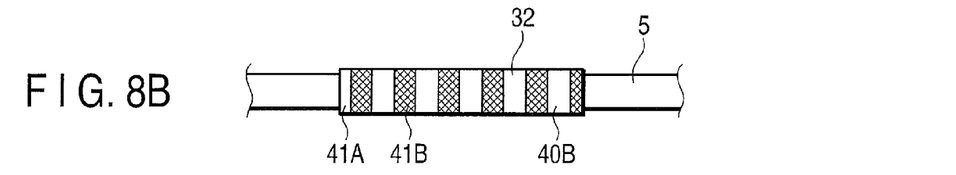
FIG. 8B is a view showing FIG. 7 from the direction of the arrow B.

FIG. 8A shows the first slit portion 40A, and FIG. 8B shows the second slit portion 40B. As shown in FIG. 8A and FIG. 8B, an A phase and a B phase where two kinds of reflecting portions 41A and 41B which differ in reflectance are longitudinally arranged with a predetermined pattern are formed in the first slit portion 40A and the second slit portion 40B, respectively. Of the two kinds of reflecting portions 41A and 41B, one with high reflectance is the first reflect portion 41A, and the other is the second reflect portion 41B. In the first slit portion 40A, the first reflect portions 41A and the second reflect portions 41B are alternately arranged with a given width along the longitudinal direction of the encoder slit part 32. In the second slit portion 40B, the first reflect portions 41A and the second reflect portions 41B are alternately arranged with the same width as that in the first slit portion 40A along the longitudinal direction of the encoder slit part 32 and in such a manner as to be longitudinally offset by a given distance with respect to the reflect portions of the first slit portion 40A. The reflect portions 41A and 41B in the second slit portion 40B are longitudinally offset by a given distance with respect to the reflecting portions 41A and 41B in the first slit portion 40A, so that there is a phase difference of 90° between an electric signal from the second slit portion 40B detected by a light receiving element of later-described optical mechanism 16 and an electric signal from the first slit portion 40A.

Figure 8C:
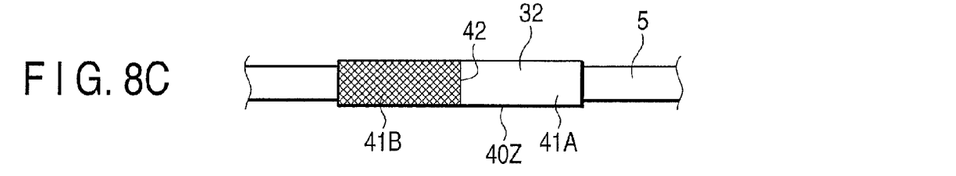
FIG. 8C is a view showing FIG. 7 from the direction of the arrow Z.

FIG. 8C shows the third slit portion 40Z. As shown in FIG. 8C, in the third slit portion 40Z, a Z phase where the first reflecting portion 41A is disposed on one side and the second reflect portion 41B is disposed across the border at a standard position 42 is formed.

The slit portions 40A, 40B, 40Z are formed by parts which are processed by, for example, laser machining, cutting, photolithography, coating agent application or laser printing on the outer peripheral surface of the encoder slit part 32, and by parts which are not processed. Thus, the processed parts scatter light and therefore serve as the second reflect portions 41B having a low coefficient of reflection toward an optical fiber 22, while the non-processed parts serve as the first reflect portions 41A having a high coefficient of reflection toward the optical fiber 22. Printed parts and non-printed parts may be provided on the outer peripheral surface of the encoder slit part 32 to form the slit portions 40A, 40B, 40Z. In this case, the printed parts serve as the second reflecting portions 41B having a low coefficient of reflection toward an optical fiber 22, while the non-printed parts serve as the first reflecting portions 41A having a high coefficient of reflection toward the optical fiber 22.

In addition, the encoder slit part 32 is preferably made of a flexible member such as an SUS pipe. This makes it possible for the encoder slit part 32 to bend integrally with the wire 5 when the wire is bent.

As shown in FIG. 3, three optical fiber holes 35 are formed in the proximal surface of the encoder head part 21 around the central hole 31. The three optical fiber holes 35 are provided at positions corresponding to the slit portions 40A, 40B, 40Z in the periaxial direction and being substantially concentrically from the central hole 31. As shown in FIG. 4, the optical fiber holes 35 are formed parallel to the central hole 31 along the longitudinal direction from the proximal surface of the encoder head part 21. Moreover, as shown in FIG. 5, light entrance/reflection holes 37 penetrating from the distal ends of the optical fiber holes 35 to the central hole 31 are formed as light transmitting portions in the encoder head part 21 perpendicularly to the slit portions 40A, 40B, 40Z, respectively. A prism 36, which is a light path conversion member, is provided between the optical fiber hole 35 and the light entrance/reflection hole 37. The optical fiber 22, which is a linear light transmitter which guides light to each of the slit portions 40A, 40B, 40Z of the encoder slit part 32, is inserted through each of the optical fiber holes 35 parallel to the wires 5. That is, the optical fibers 22 are held parallel to the wire 5 at a distance from the wire 5 by the encoder head part 21, which is a holding member.

The proximal end of the optical fiber 22 is connected to an encoder signal processing portion 15 outside the manipulator 1. The encoder signal processing portion 15 includes the optical mechanism 16 and signal processing mechanism 17 such as a signal processing circuit. Using optical elements such as a light source, lenses and a light receiving element, the optical mechanism 16 enters light to the optical fiber 22 and receives reflection light from the encoder head part 21.

Owing to such a configuration, light radiated from the light source of the optical mechanism 16 is guided to the prism 36 by the optical fiber 22. As shown, the prism 36 has, for example, two entrance/exit surfaces which are formed at an angle of 90° to each other. One of the entrance/exit surfaces faces the slit part 32 in parallel and the other of the entrance/exit surfaces faces to the optical fiber 22 in parallel. and the prism 36 has a reflective surface for forming a light path where a light beam passing through the entrance/exit surfaces moves back and forth. Then, the light is bent 90° by the prism 36, and enters each of the slit portions 40A, 40B, 40Z through the light entrance/reflection hole 37. The light reflected by the slit portions 40A, 40B, 40Z passes the light entrance/reflection hole 37, and is bent 90° by the prism 36 and thereby guided to the optical fiber 22. Then, the light passes through the optical fiber 22, and is received by the light receiving element of the optical mechanism 16. That is, the optical fiber 22 is held by the encoder head part 21 at such a position that allows the light to enter the slit portions 40A, 40B, 40Z and allows the light reflected from the slit portions 40A, 40B, 40Z to be guided. In this case, the light entrance/reflection hole 37 is formed perpendicularly to each of the slit portions 40A, 40B, 40Z, so that the light which has entered the slit portion 40A, 40B, 40Z is reflected toward the light entrance/reflection hole 37.

The reflected light received by the light receiving element of the optical mechanism 16 is converted into an electric signal. The electric signal converted by the light receiving element is sent to the signal processing mechanism 17. The signal processing mechanism 17 performs signal processing such as waveform processing and signal pulsing. An encoder output signal from the signal processing mechanism 17 is sent to the control mechanism 12. Calculation mechanism (not shown) provided in the control mechanism 12 calculates the displacement amount of the wires 5, the movement direction of the displacement, and the amount of movement from the standard position. A difference between desired displacement and the actual displacement is calculated on the basis of the calculated information, and the driving of the motor of the driving mechanism 11 is controlled.

Figure 9:
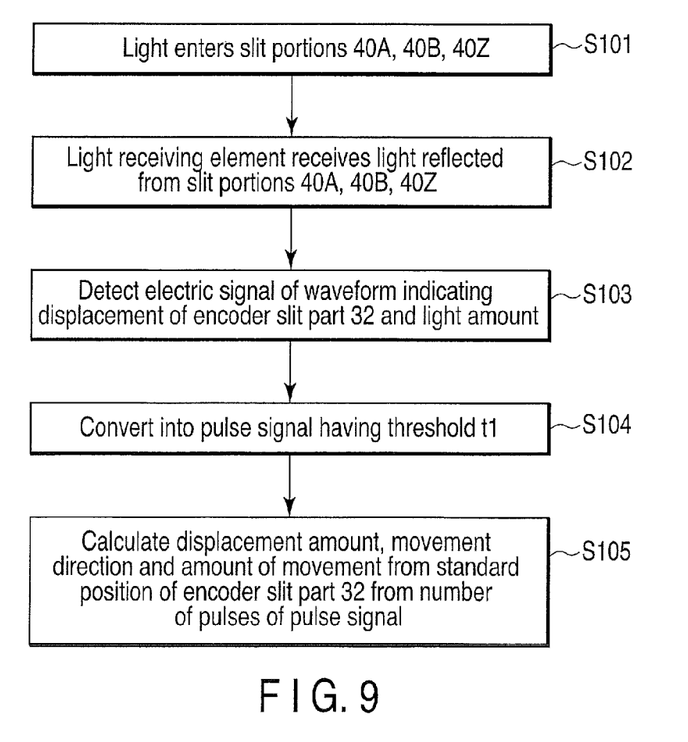
FIG. 9 is a flowchart showing the function of the optical encoder according to the first embodiment.

Now, the function of the optical encoder according to the present embodiment is described. FIG. 9 is a flowchart showing the function of the optical encoder. As shown in FIG. 9, in the optical encoder, light radiated from the light source of the optical mechanism 16 is guided to the prism 36 by the optical fiber 22. Then, the light is bent 90° by the prism 36, and enters each of the slit portions 40A, 40B, 40Z through the light entrance/reflection hole 37 (step S101). The light reflected by the slit portion 40A, 40B, 40Z passes through the light entrance/reflection hole 37 and is bent 90° by the prism 36, and is thereby guided to the optical fiber 22. Then, the light passes through the optical fiber 22, and is received by the light receiving element of the optical mechanism 16 (step S102).

Figure 10A:
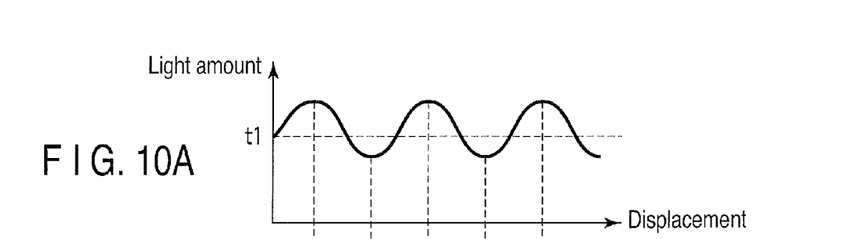
FIG. 10A is a graph showing an electric signal of a first slit portion detected by a light receiving element according to the first embodiment.
Figure 10B:
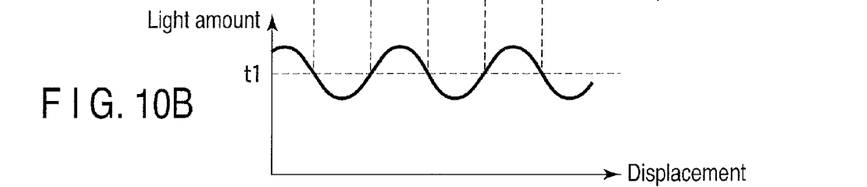
FIG. 10B is a graph showing an electric signal of a second slit portion detected by the light receiving element according to the first embodiment.
Figure 10C:
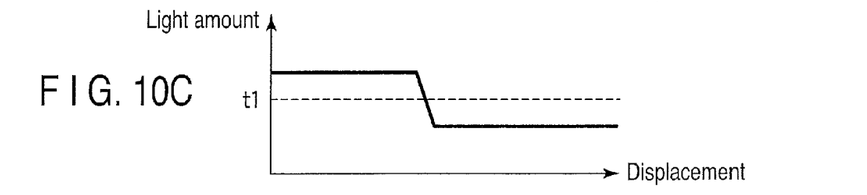
FIG. 10C is a graph showing an electric signal of a third slit portion detected by the light receiving element according to the first embodiment.

Furthermore, in order to change the bending angle of the moving part 3 of the manipulator 1, the wires 5, which are linear power transmission members, are longitudinally moved. In this case, the encoder slit part 32, which is a reflector, fixed to the outer peripheral surfaces of each of the wires 5 also longitudinally moves integrally with the wire 5. Two kinds of reflecting portions, 41A and 41B, which differ in reflectance are provided in the encoder slit part 32. Therefore, even if the same amount of light enters the first reflect portion 41A and the second reflect portion 41B, different amounts of light are received by the light receiving element of the optical mechanism 16. Further, the encoder slit part 32 moves longitudinally, and thereby electric signals of waveforms indicating the displacement of the encoder slit part 32 and light amounts as shown in FIG. 10A to FIG. 10O are detected (step S103). Here, FIG. 10A shows a waveform detected from the first slit portion 40A. FIG. 10B shows a waveform detected from the second slit portion 40B, and this waveform has a phase difference of 90° with respect to the waveform detected from the first slit portion 40A. FIG. 10O shows a waveform detected from the third slit portion 40Z. In addition, the wire 5 and the encoder slit part 32 are held by the encoder head part 21 which is a holding member, and the length of the optical path from the light source of the optical mechanism 16 to the slit portion 40A, 40B, 40Z is substantially constant regardless of longitudinal displacement of the encoder slit part 32. This enables stable detection.

Figure 11A:
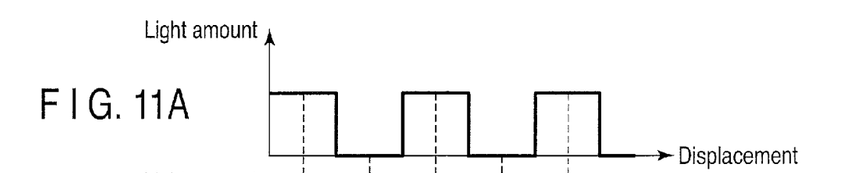
FIG. 11A is a graph showing a pulse signal of the electric signal of FIG. 10A.
Figure 11B:
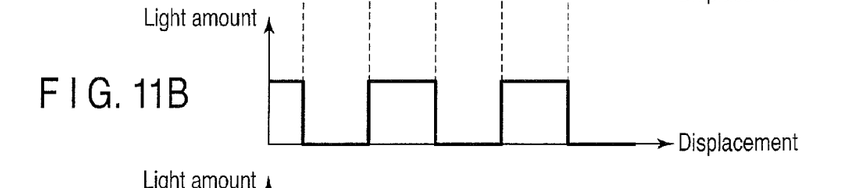
FIG. 11B is a graph showing a pulse signal of the electric signal of FIG. 10B.
Figure 11C:
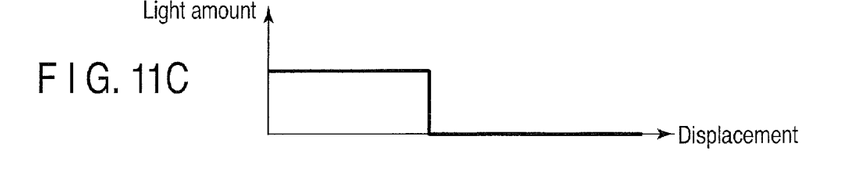
FIG. 11C is a graph showing a pulse signal of the electric signal of FIG. 10C.

Waveform signals indicating the displacement and light amounts are sent to the signal processing mechanisms 17 from the light receiving element. The signal processing mechanism 17 performs signal processing such as waveform processing and pulsing of the signals. The waveforms in FIG. 10A to FIG. 10O are converted by the signal processing into pulse signals having a threshold of t1 as shown in FIG. 11A to FIG. 11C (step S104), and the pulse signals are sent to the calculation mechanism of the control mechanism 12. Then, from the number of pulses of the pulse signal from the first slit portion 40A and from the known dimensions of the first reflecting portion 41A and the second reflecting portion 41B of the first slit portion 40A, a displacement amount of the encoder slit part 32 is calculated (step S105). Further, from the number of pulses of the pulse signal from the first slit portion 40A and the number of pulses of the pulse signal from the second slit portion 40B, the movement direction of the displacement of the encoder slit part 32 is calculated (step S105). Moreover, from the number of pulses of the pulse signal from the third slit portion 40Z, the amount of movement from the standard position is calculated (step S105). The wire 5 longitudinally moves integrally with the encoder slit part 32. As a result of this movement, the amount of longitudinal displacement, the movement direction of the displacement and the amount of movement from the standard position of the encoder slit part 32 are equal to the amount of longitudinal displacement, the movement direction of the displacement and the amount of movement from the standard position of the wire 5.

Alternatively, in step S104, a signal of the A phase may be plotted on the X axis and a signal of the B phase may be plotted on the Y axis to create a Lissajous waveform, and pulsing and multiplying processing may be performed by the equitation $\theta=\tan^{-1}(Y/X)$.

Then, the bending displacement, that is bending angle of the moving part 3, is calculated from the calculated displacement amounts of the wires 5. There are various ways of calculating the bending angle of the moving part 3 from the displacement amounts of the wires 5. One way is to actually change the displacement amounts of the wires 5 and then measure the bending angle of the moving part 3 to derive the relational expression. Another way is to create a table. Then, the amounts of movement of the wires detected by an optical fiber encoder are applied to the relational expression or the table to calculate the bending angle of the moving part 3.

Figure 12A:
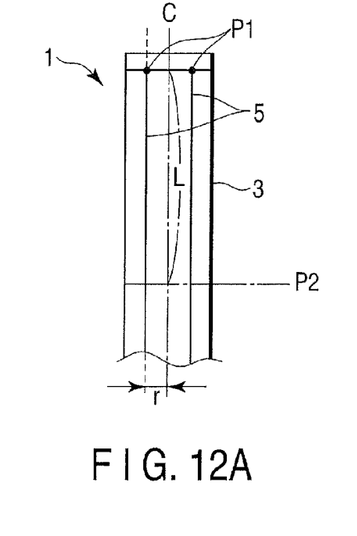
FIG. 12A is a schematic view showing a moving part of the manipulator according to the first embodiment in a state that the moving part is unbent.
Figure 12B:
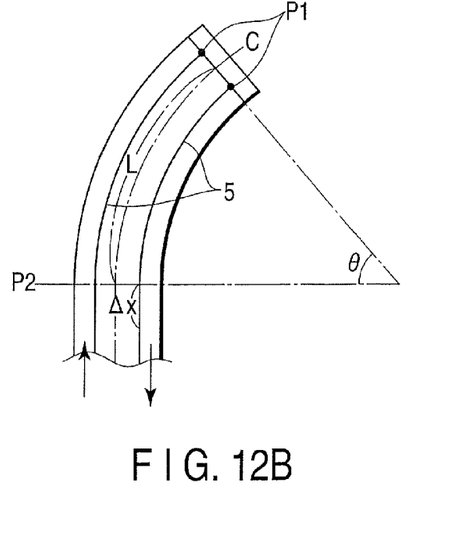
FIG. 12B is a schematic view showing the moving part of the manipulator according to the first embodiment in a state that the moving part is bent.

The other way is described with FIG. 12A and FIG. 12B. FIG. 12A and FIG. 12B are schematic views showing the moving part 3 of the manipulator 1. As shown in FIG. 12A, wire attachment positions P1 where the wires 5 are attached is located in the vicinity of the distal end of the moving part 3. The moving part 3 has a bending origination position P2 which is located on the most proximal side of the part bent when the wires 5 are pulled. The length of a central axis line C between the wire attachment position P1 and the bending origination position P2 is L. The diametrical length from the central axis line C to the wire attachment positions P1 is r. If the curvature of the bent portion is the same at every position when one wire 5 is pulled by a length of $\Delta x$ and the other wire 5 is pushed out by $\Delta x$ as shown in FIG. 12B, the length L remains the same as that in the case where there is no bending shown in FIG. 12A. In this case, the relation of the movement amounts $\Delta x$ of the wires 5 to the angle $\theta$ between the bending origination position P2 and the wire attachment position P1 can be found by $\theta=\Delta x/r$.

Although either upward/downward bending or leftward/rightward bending is made in this case described here, the above equation is also satisfied when there are upward/downward bending and leftward/rightward bending at the same time.

Thus, the optical encoder having the above-described configuration has the following effects: In the optical encoder, light enters the slit portions 40A, 40B, 40Z in which two kinds of reflecting portions, 41A and 41B, which differ in reflectance are longitudinally arranged with a predetermined pattern (step S101), and the light reflected by the slit portions 40A, 40B, 40Z is received by the light receiving element (step S102). The first reflect portion 41A and the second reflect portion 41B are different in the amount of light to be guided to the optical fiber 22. Therefore, if the encoder slit part 32 longitudinally moves integrally with the wire 5, electric signals of waveforms indicating the displacement of the encoder slit part 32 and light amounts are detected by the light receiving element of the optical mechanism 16 (step S103). Then, the electric signals are converted into pulse signals having a particular threshold by the signal processing mechanism 17 (step S104). From the number of pulses of the pulse signal detected by the calculation mechanism of the control mechanism 12 and from the known dimensions of the first reflecting portion 41A and the second reflecting portion 41B of the encoder slit part 32, the displacement amount, the movement direction of the displacement and the amount of movement from the standard position of the encoder slit part 32 are calculated (step S105). The wire 5 longitudinally moves integrally with the encoder slit part 32. Thus, the longitudinal displacement of the wires 5 can be precisely detected from the displacement amount, the movement direction of the displacement and the amount of movement from the standard position of the encoder slit part 32.

Furthermore, in the optical encoder, light is guided to the slit portions 40A, 40B, 40Z by the optical fiber 22. Thus, the optical encoder is reduced in size. Consequently, the encoder head part 21 which holds the encoder slit part 32 can be held in a diametrically small tube at the distal end of, for example, the manipulator or endoscope.

Still further, since no electric components are provided in the encoder head part 21, there is no need to provide a plurality of wiring lines to be connected to the electric components, and the effect of electric noise is reduced at the time of detection. This makes it possible to simplify the configuration of the optical encoder and to easily sterilize and clean for example, the manipulator or endoscope.

Further yet, in the optical encoder, the optical fiber 22 is held parallel to the wire 5 by the encoder head part 21, which is a holding member, and the prism 36 is provided between the distal end of the optical fiber 22 and the light entrance/reflection hole 37. Light radiated from the light source is guided to the prism 36 by the optical fiber 22. Then, the light is bent 90° by the prism 36, and enters each of the slit portions 40A, 40B, 40Z through the light entrance/reflection hole 37. The light reflected by the slit portions 40A, 40B, 40Z passes through the light entrance/reflection hole 37 and is bent 90° by the prism 36, and is thereby guided to the optical fiber 22. Then, the light passes through the optical fiber 22, and is received by the light receiving element of the optical mechanism 16. The prism 36 is provided so that the optical fiber 22 is located in an unbent state at such a position that allows the light to enter the slit portions 40A, 40B, 40Z and allows the light reflected from the slit portions 40A, 40B, 40Z to be guided. Thus, the encoder head part 21 can be further reduced in size. In this case, the light entrance/reflection hole 37 is formed perpendicularly to each of the slit portions 40A, 40B, 40Z, so that the light which has entered the slit portion 40A, 40B, 40Z is reflected toward the light entrance/reflection hole 37. This enables an improvement in detection accuracy.

Now, first to third modifications of the first embodiment of the present invention are described with reference to FIG. 13 to FIG. 18. The configuration in the first embodiment is modified in the following manners in the first to third modifications. It is to be noted that the same parts as the parts in the first embodiment are provided with the same reference numbers and are not described.

Figure 13:
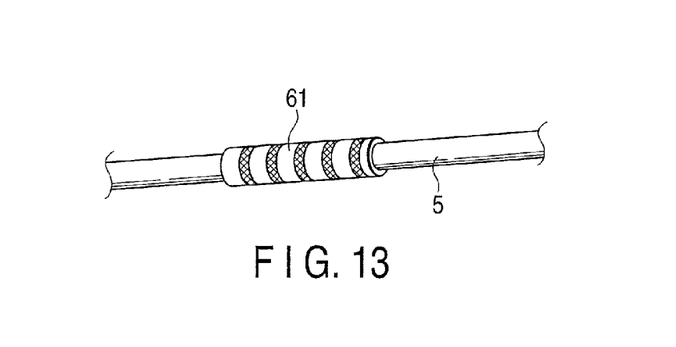
FIG. 13 is a perspective view showing the configuration of an encoder slit part according to a first modification of the first embodiment.
Figure 14:
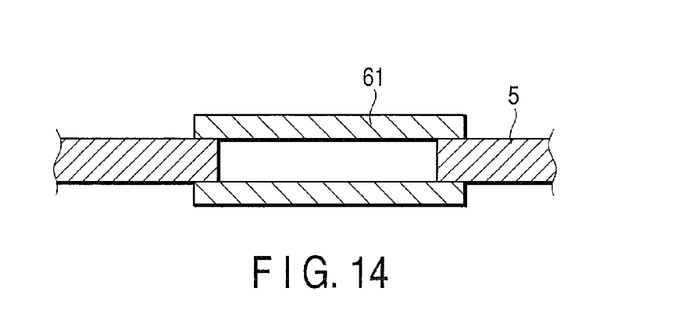
FIG. 14 is a longitudinal sectional view showing the configuration of the encoder slit part according to the first modification of the first embodiment.

FIG. 13 and FIG. 14 are views showing the configuration of an encoder slit part 61 in the first modification. As shown in FIG. 13 and FIG. 14, the encoder slit part 61 is cylindrically shaped. The wire 5 is not inserted through the encoder slit part 61, and the wires 5 are fixed at both ends of the encoder slit part 61.

Figure 15:
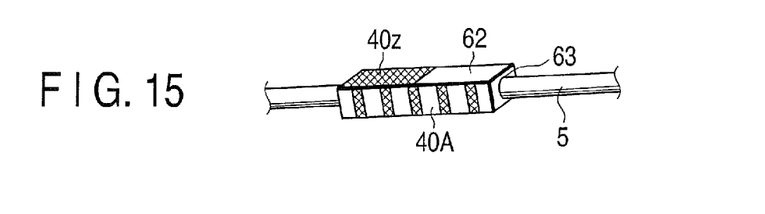
FIG. 15 is a perspective view showing the configuration of an encoder slit part according to a second modification of the first embodiment.

FIG. 15 is a view showing the configuration of an encoder slit part 62 in the second modification. As shown in FIG. 15, the encoder slit part 62 is in the shape of a quadratic prism. A wire insertion hole 63 that longitudinally penetrates the encoder slit part 62 is formed in the encoder slit part 62, and the wire 5 is inserted through the wire insertion hole 63 in a fixed state. The slit portions 40A, 40B, 40Z of the A phase, B phase and Z phase are formed in any three of four surfaces parallel to the longitudinal direction of the encoder slit part 62.

Figure 16:
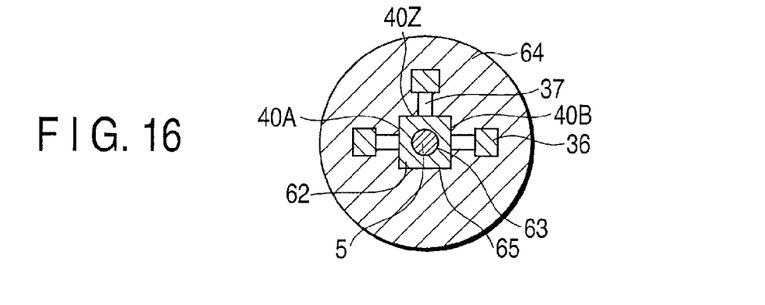
FIG. 16 is a cross-sectional view showing the configuration of an encoder head part according to a second modification of the first embodiment.

FIG. 16 is a view showing the configuration of an encoder head part 64 which holds the encoder slit part 62. As shown in FIG. 16, a central hole 65 in the shape of a quadratic prism is formed in the axial center of the encoder head part 64, and the encoder slit part 62 and the wire 5 are inserted through the central hole 65. As in the encoder head part 21, three optical fiber holes 35, three prisms 36 and three light entrance/reflection holes 37 are provided in the encoder head part 64. The optical fiber holes 35 are provided at positions corresponding to the slit portions 40A, 40B, 40Z in the periaxial direction, and the optical fibers 22 are inserted therethrough parallel to the wire 5. The light entrance/reflection holes 37 are formed perpendicularly to three surfaces of the encoder slit part 62 where the slit portions 40A, 40B, 40Z are formed. Such a configuration allows light to enter perpendicularly to the surfaces of the encoder slit part 62 where the slit portions 40A, 40B, 40Z are formed.

Figure 17:
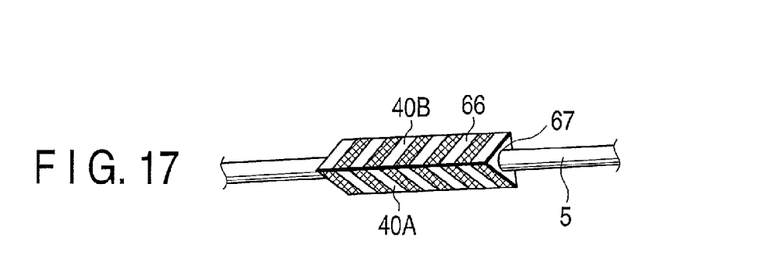
FIG. 17 is a perspective view showing the configuration of an encoder slit part according to a third modification of the first embodiment.

FIG. 17 is a view showing the configuration of an encoder slit part 66 in the third modification. As shown in FIG. 17, the encoder slit part 66 is in the shape of a triangular prism. A wire insertion hole 67 that longitudinally penetrates the encoder slit part 66 is formed in the encoder slit part 66, and the wire 5 is inserted through the wire insertion hole 67 in a fixed state. The slit portions 40A, 40B, 40Z of the A phase, B phase and Z phase are formed in three surfaces parallel to the longitudinal direction of the encoder slit part 66.

Figure 18:
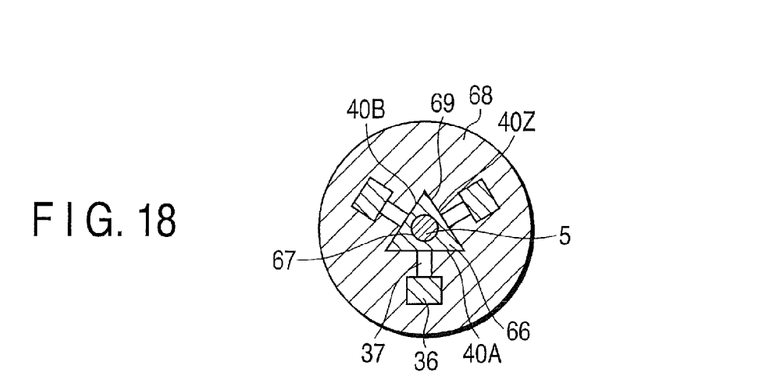
FIG. 18 is a cross-sectional view showing the configuration of an encoder head part according to the third modification of the first embodiment.

FIG. 18 is a view showing the configuration of an encoder head part 68 which holds the encoder slit part 66. As shown in FIG. 18, a central hole 69 in the shape of a triangular prism is formed in the axial center of the encoder head part 68, and the encoder slit part 66 and the wire 5 are inserted through the central hole 69. As in the encoder head part 21, three optical fiber holes 35, three prisms 36 and three light entrance/reflection holes 37 are provided in the encoder head part 68. The optical fiber holes 35 are provided at positions corresponding to the slit portions 40A, 40B, 40Z in the periaxial direction, and the optical fibers 22 are inserted therethrough parallel to the wire 5. The light entrance/reflection holes 37 are formed perpendicularly to three surfaces of the encoder slit part 66 where the slit portions 40A, 40B, 40Z are formed. Such a configuration allows light to enter perpendicularly to the surfaces of the encoder slit part 66 where the slit portions 40A, 40B, 40Z are formed.

As shown in the first to third modifications above, any configuration may be provided in the present embodiment as long as the wires 5 and the encoder slit part are held by the encoder head part, which is a holding member, and as long as the wires 5 and the encoder head part are integrally movable in the longitudinal direction.

Now, fourth and fifth modifications of the first embodiment of the present invention are described with reference to FIG. 19 and FIG. 20. The configuration in the first embodiment is modified in the following manner in the fourth and fifth modification. It is to be noted that the same parts as the parts in the first embodiment are provided with the same reference numbers and are not described.

Figure 19:
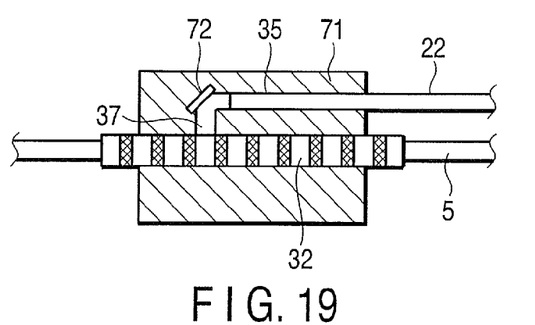
FIG. 19 is a longitudinal sectional view showing the configuration of an encoder head part according to a fourth modification of the first embodiment.

FIG. 19 is a view showing the configuration of an encoder head part 71 in the fourth modification. As shown in FIG. 19, a mirror 72 is used as a light path conversion member in the encoder head part 71. Light radiated from the light source of the optical mechanism 16 is guided to the mirror 72 by the optical fiber 22. Then, the light is bent 90° by the mirror 72, and enters each of the slit portions 40A, 40B, 40Z through the light entrance/reflection hole 37. The light reflected by the slit portions 40A, 40B, 40Z passes through the light entrance/reflection hole 37 and is bent 90° by the mirror 72, and is thereby guided to the optical fiber 22. Then, the light passes through the optical fiber 22, and is received by the light receiving element of the optical mechanism 16. That is, the optical fiber 22 is held by the encoder head part 71 at such a position that allows the light to enter the slit portions 40A, 40B, 40Z and allows the light reflected from the slit portions 40A, 40B, 40Z to be guided. In this case, the light entrance/reflection hole 37 is formed perpendicularly to each of the slit portions 40A, 40B, 40Z, so that the light which has entered the slit portions 40A, 40B, 40Z is reflected toward the light entrance/reflection holes 37.

Figure 20:
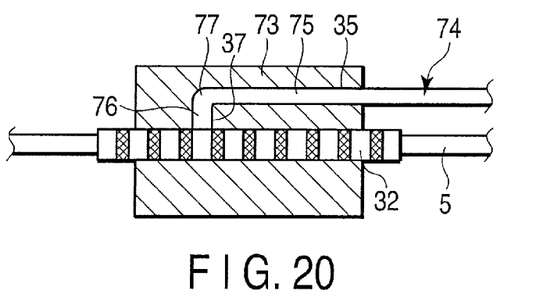
FIG. 20 is a longitudinal sectional view showing the configuration of an encoder head part according to a fifth modification of the first embodiment.

FIG. 20 is a view showing the configuration of an encoder head part 73 in a fifth modification. As shown in FIG. 20, in the encoder head part 73, an optical fiber 74 which guides light to the slit portions 40A, 40B, 40Z passes through the optical fiber hole 35 from the proximal surface of the encoder head part 73, is bent at the distal end of the optical fiber hole 35, and inserted into the light entrance hole 37. The optical fiber 74 includes a held portion 75 held parallel to the wire 5 in the optical fiber hole 35 by the encoder head part 73, a light entrance/reflection portion 76 inserted in the light entrance hole 37 perpendicularly to the slit portion 40A, 40B, 40Z, and a bent portion 77 provided between the held portion 75 and the light entrance/reflection portion 76. The bent portion 77 of the optical fiber 74 serves as a light path conversion portion that can convert the path of the light in the tube. Light radiated from the light source of the optical mechanism 16 passes through the held portion 75 of the optical fiber 74, and is guided to the bent portion 77. Then, the path of the light is converted by the bent portion 77, and the light enters each of the slit portions 40A, 40B, 40Z through the light entrance/reflection portion 76. The light reflected by the slit portions 40A, 40B, 40Z passes through the light entrance/reflection portion 76, and has its path converted by the bent portion 77 and is thereby guided to the held portion 75. Then, the light is received by the light receiving element of the optical mechanism 16. That is, the optical fiber 74 is held by the encoder head part 73 at such a position that allows the light to enter the slit portions 40A, 40B, 40Z and allows the light reflected from the slit portions 40A, 40B, 40Z to be guided.

In such a configuration, the light entrance/reflection portion 76 is formed perpendicularly to each of the slit portions 40A, 40B, 40Z, so that the light which has entered the slit portions 40A, 40B, 40Z is reflected toward the light entrance/reflection portion 76. Moreover, as no light path conversion member such as the prism 36 and the mirror 72 is used, a reduction of the light amount in the light path conversion member is prevented. This enables an improvement in detection accuracy.

Now, a sixth modification of the first embodiment of the present invention is described with reference to FIG. 21. The configuration in the first embodiment is modified in the following manner in the sixth modification. It is to be noted that the same parts as the parts in the first embodiment are provided with the same reference numbers and are not described.

Figure 21:
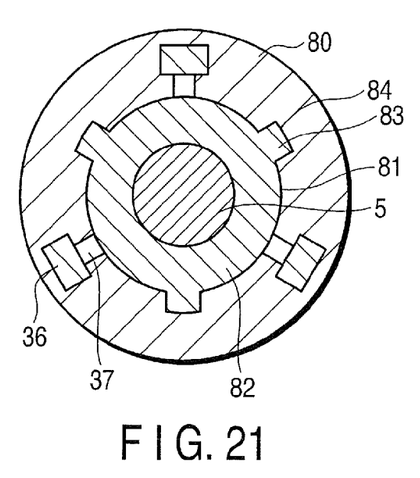
FIG. 21 is a cross-sectional view showing the configuration of an encoder head part according to a sixth modification of the first embodiment.

FIG. 21 is a view showing the configuration of an encoder head part 80 in the sixth modification. As shown in FIG. 21, a cylindrical encoder slit part hole 81 is formed in the axial center of the encoder head part 80, and an encoder slit part 82 and the wire 5 are inserted through the encoder slit part hole 81. The encoder slit part 82 is provided with three protrusions 83 outwardly protruding from the outer peripheral surface. The sectional shape of the protrusion 83 cut in a section perpendicular to the longitudinal direction is quadrangular. In the encoder slit part hole 81 of the encoder head part 80, three grooves 84 in a shape corresponding to the protrusions 83 of the encoder slit part 82 are formed at positions corresponding to the protrusions 83 in the periaxial direction. The protrusions 83, which are engaging portions, engage with the grooves 84, which are engaged portions, such that the periaxial movement of the encoder slit part 82 and the wire 5 with respect to the encoder head part 80 can be regulated. In this case, the encoder slit part 82 and the wire 5 are movable with respect to the encoder head part 80 in the longitudinal direction.

Although three protrusions 83 are provided in the present modification, one or more protrusions 83 have only to be formed on the outer peripheral surface of the encoder slit part 82. Moreover, the sectional shape of the protrusion 83 cut in a section perpendicular to the longitudinal direction is not exclusively quadrangular, and may be, for example, triangular.

Although three kinds of slit portions 40A, 40B, 40Z are formed in the encoder slit part 32 in the embodiment described above, one or two kinds of slit portions may be only formed, or four or more kinds of slit portions may be formed. In this case, pulse signals of one or two kinds of slit portions or pulse signals of four or more kinds of slit portions may be used to calculate the longitudinal displacement of the wire 5. Moreover, the cylindrical encoder slit part 32 may be partially cut solely in its circumferential portions corresponding to the slit portions 40A, 40B, 40Z and corresponding to the regions where reflected light can be guided to the light entrance/reflection holes 37, in order to form planes perpendicular to the light entrance/reflection holes 37 along the longitudinal direction, as in the second and third modifications.

Furthermore, in the embodiment described above, the first slit portion 40A and the second slit portion 40B are different in the arrangement pattern of the first reflecting portions 41A and the second reflect portions 41B in the longitudinal direction so that there is a phase difference of 90° between the electric signal detected from the second slit portion 40B and the electric signal detected from the first slit portion 40A. However, the first slit portion 40A and the second slit portion 40B may have the same arrangement pattern of the first reflect portions 41A and the second reflect portions 41B in the longitudinal direction, and the light entrance/reflection holes 37 which allow light to enter the slit portions 40A, 40B may be displaced offset with respect to each other in the longitudinal direction.

Still further, optical system such as a convex lens or ball lens which collimates the light entering the slit portion 40A, 40B, 40Z may be disposed in the light entrance/reflection hole 37.

Further yet, although the manipulator 1 that uses the optical encoder has been described in the present embodiment, this is not a limitation as long as the longitudinal displacement of the linear power transmission member is to be detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical encoder comprising:
   a linear power transmission member which moves longitudinally;
   a reflector which is fixed onto an outer peripheral surface of the linear power transmission member and which is longitudinally movable integrally with the linear power transmission member, the reflector including a slit portion in which two kinds of reflecting portions different in reflectance are longitudinally arranged with a predetermined pattern;
   a light source which radiates light;
   a linear light transmitter which guides the light from the light source to the slit portion and to which reflection light reflected from the slit portion is guided; and
   a holding member which longitudinally movably holds the linear power transmission member and the reflector and also holds the linear light transmitter at such a position that allows the light to enter the slit portion and allows the reflection light from the slit portion to be guided;
   a light receiving element which receives the reflection light in the slit portion guided from the linear light transmitter and which detects an electric signal indicating a displacement of the reflector and a light amount;
   a signal processing mechanism configured to convert the electric signal into a pulse signal having a predetermined threshold; and
   a calculation mechanism configured to calculate the longitudinal displacement of the reflector from a number of pulses of the pulse signal.

2. The optical encoder according to claim 1, wherein the reflector includes a plurality of kinds of slit portions provided side by side along a circumferential direction of an outer peripheral surface,
   each of the slit portions being set in a different arrangement pattern of the two kinds of reflecting portions in a longitudinal direction with respect to the other/the others of the slit portions,
   the linear light transmitter being provided for each of the slit portions.

3. The optical encoder according to claim 2, wherein the plurality of kinds of slit portions include
   a first slit portion in which the two kinds of reflecting portions are alternately arranged with a given width along the longitudinal direction,
   a second slit portion in which the two kinds of reflecting portions are alternately arranged with the same width as that in the first slit portion along the longitudinal direction and in such a manner as to be longitudinally offset by a given distance with respect to the reflect portions of the first slit portion, and
   a third slit portion in which one of the two kinds of reflect portions is disposed on a distal side and the other is disposed on a proximal side across a border at a predetermined standard position.

4. The optical encoder according to claim 1, wherein the reflector includes an engaging portion partially provided on the outer peripheral surface in the circumferential direction, the engaging portion being at least one of a concave portion and a convex portion, and
   the holding member includes an engaged portion which is engaged with the engaging portion and which is configured to regulate a periaxial movement of the reflector.

5. The optical encoder according to claim 1, wherein the linear light transmitter includes
  a held portion which is held parallel to the linear power transmission member by the holding member,
  a light entrance/reflection portion perpendicular to the slit portion of the reflector, and
  a light path conversion portion which is provided between the held portion and the light entrance/reflection portion and which converts a path of the light.

6. The optical encoder according to claim 1, wherein the holding member includes a central hole which is provided in an axially central portion and into which the reflector is inserted, and a light transmitting portion formed perpendicularly to the slit portion of the reflector,
  the linear light transmitter is held parallel to the linear power transmission member by the holding member, and
  a light path conversion member which converts a path of the light is provided between a distal end of the linear light transmitter and the light transmitting portion.

7. A bending operation system comprising:
  an elongated tubular part;
  a linear power transmission member disposed in the tubular part;
  a moving part to which a distal end of the linear power transmission member is connected and which is configured to perform a bending operation in accordance with a longitudinal movement of the linear power transmission member;
  a driving mechanism configured to drive the moving part; and
  an optical encoder including:
  a reflector which is fixed onto the outer peripheral surface of the linear power transmission member and which is longitudinally movable integrally with the linear power transmission member, the reflector including a slit portion in which two kinds of reflecting portions different in reflectance are longitudinally arranged with a predetermined pattern;
  a light source which radiates light;
  a linear light transmitter which guides the light from the light source to the slit portion and to which reflection light reflected from the slit portion is guided;
  a holding member which longitudinally movably holds the linear power transmission member and the reflector and also holds the linear light transmitter at such a position that allows the light to enter the slit portion and allows the reflection light from the slit portion to be guided;
  a light receiving element which receives the reflection light in the slit portion guided from the linear light transmitter and which detects an electric signal indicating a displacement of the reflector and a light amount;
  a signal processing mechanism configured to convert the electric signal into a pulse signal having a predetermined threshold; and
  a calculation mechanism configured to calculate the longitudinal displacement of the reflector from a number of pulses of the pulse signal and also calculate a bending angle and a bending direction of the moving part from the longitudinal displacement of the reflector.

8. The bending operation system according to claim 7, wherein the reflector includes a plurality of kinds of slit portions provided side by side along a circumferential direction of an outer peripheral surface,
  each of the slit portions being set in a different arrangement pattern of the two kinds of reflecting portions in a longitudinal direction with respect to the other/the others of the slit portions,
  the linear light transmitter being provided for each of the slit portions.

9. The bending operation system according to claim 8, wherein the plurality of kinds of slit portions include
  a first slit portion in which the two kinds of reflecting portions are alternately arranged with a given width along the longitudinal direction,
  a second slit portion in which the two kinds of reflecting portions are alternately arranged with the same width as that in the first slit portion along the longitudinal direction and in such a manner as to be longitudinally offset by a given distance with respect to the reflect portions of the first slit portion, and
  a third slit portion in which one of the two kinds of reflect portions is disposed on a distal side and the other is disposed on a proximal side across a border at a predetermined standard position.

10. The bending operation system according to claim 7, wherein the reflector includes an engaging portion partially provided on the outer peripheral surface in the circumferential direction, the engaging portion being at least one of a concave portion and a convex portion, and
  the holding member includes an engaged portion which is engaged with the engaging portion and which is configured to regulate a periaxial movement of the reflector.

11. The bending operation system according to claim 7, wherein the linear light transmitter includes
  a held portion which is held parallel to the linear power transmission member by the holding member,
  a light entrance/reflection portion perpendicular to the slit portion of the reflector, and
  a light path conversion portion which is provided between the held portion and the light entrance/reflection portion and which converts a path of the light.

12. The bending operation system according to claim 7, wherein the holding member includes a central hole which is provided in an axially central portion and into which the reflector is inserted, and a light transmitting portion formed perpendicularly to the slit portion of the reflector,
  the linear light transmitter is held parallel to the linear power transmission member by the holding member, and
  a light path conversion member which converts a path of the light is provided between a distal end of the linear light transmitter and the light transmitting portion.

13. A method of detecting a displacement of a linear power transmission member which moves longitudinally, the method comprising:
  radiating light by a light source:
  guiding the light from the light source to a slit portion via a linear light transmitter, the slit portion being provided in a reflector which is fixed onto an outer peripheral surface of the linear power transmission member and which is longitudinally movable integrally with the linear power transmission member, the slit portion including two kinds of reflecting parts different in reflectance which are longitudinally arranged with a predetermined pattern;
  holding, by a holding member which longitudinally movably holds the linear power transmission member and the reflector, the linear light transmitter at such a position that allows the light to enter the slit portion, thereby entering the light to the slit portion;

holding, by a holding member, the linear light transmitter at such a position that allows reflection light reflected by the slit portion to be guided, thereby guiding the reflection light to a light receiving element by the linear light transmitter:

receiving the reflection light, which is guided by the linear light transmitter, by a light receiving element;

detecting, by the light receiving element, an electric signal indicating a displacement of the reflector and a light amount;

converting, by signal processing mechanism, the electric signal into a pulse signal having a predetermined threshold; and calculating, by calculation mechanism, the longitudinal displacement of the reflector from a number of pulses of the pulse signal.

* * * * *